United States Patent
Nesbitt

(10) Patent No.: US 6,330,565 B1
(45) Date of Patent: Dec. 11, 2001

(54) DATABASE MANAGEMENT SYSTEM AND METHOD FOR STORING PERSISTENT AND NON-PERSISTENT ATTRIBUTES

(75) Inventor: David P. Nesbitt, Redondo Beach, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/067,014

(22) Filed: Apr. 28, 1998

Related U.S. Application Data
(60) Provisional application No. 60/147,440, filed on Aug. 5, 1999.

(51) Int. Cl.$^7$ .................................................... G06F 17/00
(52) U.S. Cl. .................................................... 707/103
(58) Field of Search .................. 707/1–206, 500–507, 707/526; 711/162–202; 714/16; 709/201

(56) References Cited

U.S. PATENT DOCUMENTS

| | | | |
|---|---|---|---|
| 4,814,971 | * | 3/1989 | Thatte .................................. 714/15 |
| 4,853,842 | * | 8/1989 | Thatte et al. ........................ 707/206 |
| 5,008,786 | * | 4/1991 | Thatte .................................. 711/162 |
| 5,452,447 | * | 9/1995 | Nelson et al. ....................... 707/205 |
| 5,943,679 | * | 8/1999 | Niles et al. .......................... 707/526 |
| 5,995,985 | * | 11/1999 | Cai ...................................... 707/507 |
| 6,026,474 | * | 2/2000 | Carter et al. ........................ 711/202 |
| 6,055,063 | * | 4/2000 | Yang et al. .......................... 709/201 |

* cited by examiner

Primary Examiner—Thomas Black
Assistant Examiner—David Jung
(74) Attorney, Agent, or Firm—Oliff & Berridge, PLC

(57) ABSTRACT

A method and apparatus are provided for storing non-persistent attributes separately from persistent attributes in a print management system. The system server may register callback functions with the object database which allow an attribute to be stored non-persistently, yet be obtained from the object database as if they were stored as one of the persistent attributes. The server attempts to retrieve the attribute from an object database. The object database may then determine whether the requested attribute has been registered as non-persistent in a separate virtual memory. If the requested attribute is registered as non-persistent, the object database invokes the callback function. Otherwise, if the requested attribute is not registered as non-persistent, the object database retrieves the information from disk using a database application program.

20 Claims, 4 Drawing Sheets

DATABASE MANAGEMENT SYSTEM AND METHOD FOR STORING PERSISTENT AND NON-PERSISTENT ATTRIBUTES

This nonprovisional application claims the benefit of the U.S. provisional application No. 60/147,440 entitled "Internet Traffic Engineering by Optimizing OSPF Weights" filed on Aug. 5, 1999 (Attorney Docket No. 1999-0467, 105039). The Applicant of the provisional application is Mikkel Thorup. The above provisional application is hereby incorporated by references including all references cited therein.

BACKGROUND OF THE INVENTION

1. Field of Invention

This invention relates to the handling and storage of attributes in a print management system. In particular, this invention is directed to the separate storage of persistent and non-persistent attributes.

2. Description of Related Art

Print management systems provide a method to control and access various printers and to manage other related information remotely. However, in the current systems, the extent to which these functions can be utilized is limited by the fixed set of predefined system attributes.

Attributes are collections of data that describe the entities that compose the print management system. In other words, attributes define or characterize print management systems abstract entities, or objects. For example, document attributes, such as plex, margin, orientation, etc., describe how the printed material should appear. Printer attributes, such as media-ready, fonts-ready, etc., describe the available resources or features of the printer. Other printer attributes may describe the various printing features that users may use to produce high-quality documents, or they may describe status or configuration information, such as the printer's state or location. In addition to these attributes, there are a set of attributes to facilitate end-user, operator and administrator functions. In summary, attributes are a set of data that describes the objects of the printer management system.

There are three basic elements to an attribute: an object identifier (OID), a syntax and a value. An OID is a globally unique identifier of an attribute which is coded such that it may be understood by all printing systems. The OIDs are allocated following a tree format, such that each printer vendor or standard organization is designed as a branch of this tree. Then each organization may assign unique OIDs by further branching out.

For example, the OID of "job-owner" is 1.0.10175.1.3.1.3 in the ISO 10175 standard for Document Printing Applications (DPA). If the server receives the "job-owner" attribute, the server can store the attribute or send this information to an account log upon completion of a print job using the OIDs, for example. Then, an accounting program written by a third party vendor can easily interpret the information in the accounting log through the OIDs.

The syntax of an attribute is the format in which the attribute value is represented. For example, the syntax of the "job-owner" attribute is "distinguishedNameString", which is an example of coded language the computer or printing system understands.

The value of an attribute is the instance of the attribute. For example, the value of "job-owner" could be "John Jones", i.e., the name of the person to whom the print job belongs.

FIG. 1 is a diagram of a print management system 100 showing the interaction between the client 130, the server 110 and the output device 140. The output device 140 is, for example, a printer. The client 130 is the interface between the user and the print management system. The server 110 takes print requests from multiple clients 130, schedules print jobs based on the print requests and then forwards the print jobs to the output device 140.

For example, when a user submits a print job by selecting documents, the printer and other attributes, the client 130 puts together this data and sends it to the server 110. The server 110 then reads the data and stores the document data in a print data memory and creates an abstract entity, a job object, that contains the attributes specified in the data package from the client 130 and stores it in the object database 120. When the output device 140 is ready to print a new job, the server 110 retrieves the document data from the print data memory and sends the document data to the output device 140. The server 110 also retrieves the job object attributes from the object database 120, and based on these attributes, sends print controls to the output device 140.

The processing of attributes in a print management system is described, for example, in U.S. patent application Ser. No. 08/976,180, "FILTER INTERFACE FOR MANAGING PRINTER SYSTEM INFORMATION," filed Nov. 21, 1997, now U.S. Pat. No. 617,839 and U.S. patent application Ser. No. 08/966,406, "DYNAMIC EXTENSION OF PRINT CAPABILITIES," filed Nov. 7, 1997, now U.S. Pat. No. 6,055,063 the subject matter of which are incorporated herein by reference.

Many object-based programs store attributes persistently (i.e., stored in a resident memory and continuously read and updated), so that this information can be maintained during system restart. As shown in FIG. 2, an object database 120 is often used to achieve this persistency.

However, there are many attributes that do not need to be stored persistently, such as those that are reset at restart or are dynamically calculated. The storage of these non-persistent attributes in the object database increases the number of input and output transactions required, increases the use of disk space, and slows down system performance.

SUMMARY OF THE INVENTION

This invention provides a method and apparatus for storing non-persistent attributes separately from persistent attributes in a print management system. The system server may register callback functions with the object database which allow an attribute to be stored non-persistently, yet be obtained from the object database as if they were stored as one of the persistent attributes. The server attempts to retrieve the attribute from an object database. The object database may then determine whether the requested attribute has been registered as non-persistent in a separate virtual memory. If the requested attribute is registered as non-persistent, the object database invokes the callback function. Otherwise, if the requested attribute is not registered as non-persistent, the object database retrieves the information from disk using a database application program.

These and other features and advantages of this invention are described or are apparent from the following detailed description of the preferred embodiments.

BRIEF DESCRIPTION OF THE DRAWINGS

The invention is described in detail with reference to the following drawings, wherein like numerals represent like elements and wherein.

DETAILED DESCRIPTION OF PREFERRED EMBODIMENTS

The following embodiments illustrate the use of non-persistent storage of attributes in printing systems. However, the use of the invention in printing systems is only an exemplary illustration. The separate storage of non-persistent attributes may be applied to any object-oriented system.

Figure 1:
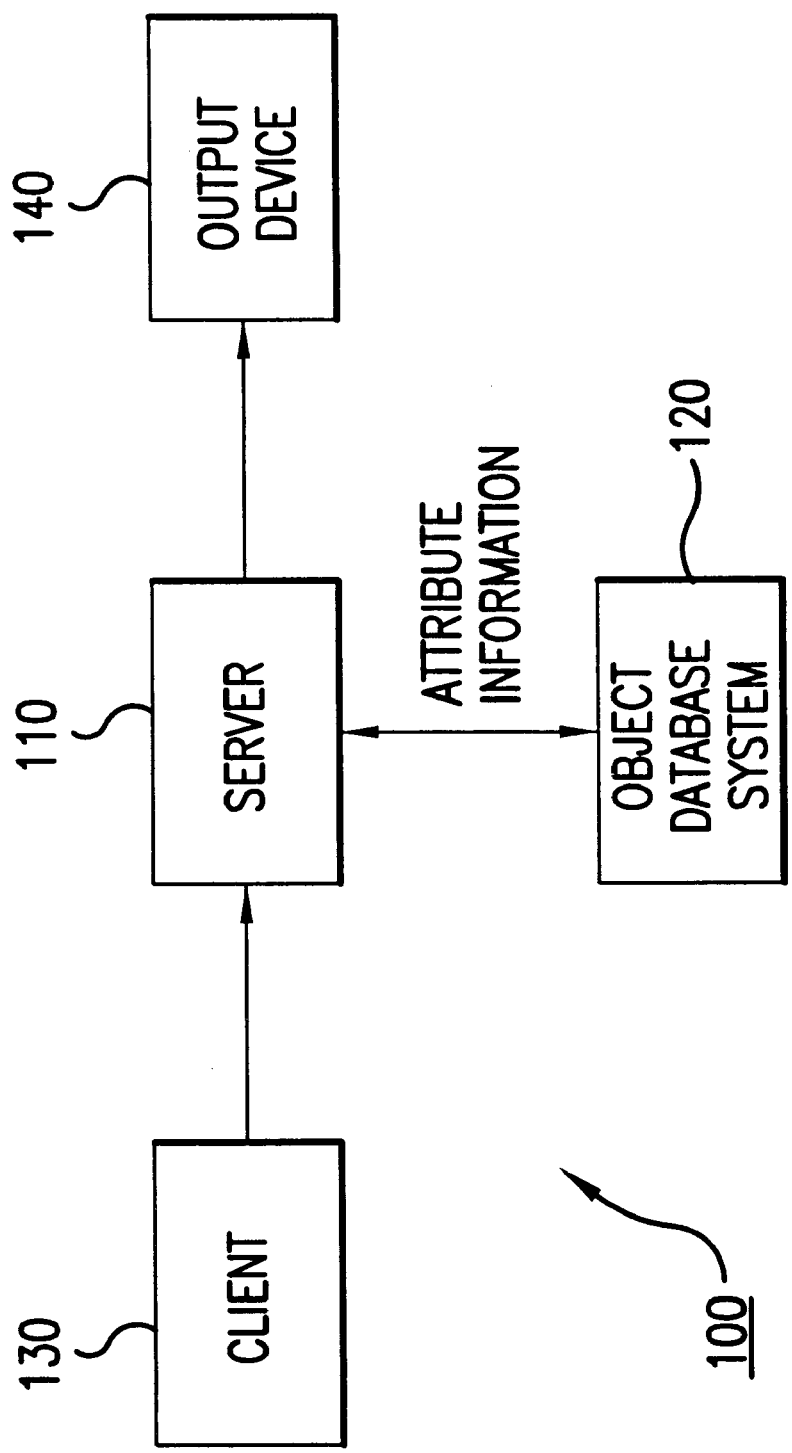
FIG. 1 is a diagram of the conventional flow of document and attribute data in a print management system.
Figure 2:
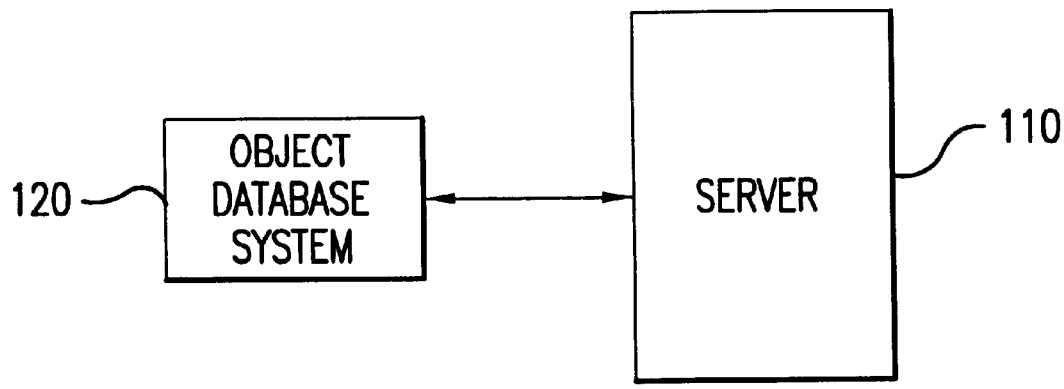
FIG. 2 is a diagram of the conventional flow of attribute data between an object database and a server system.
Figure 3:
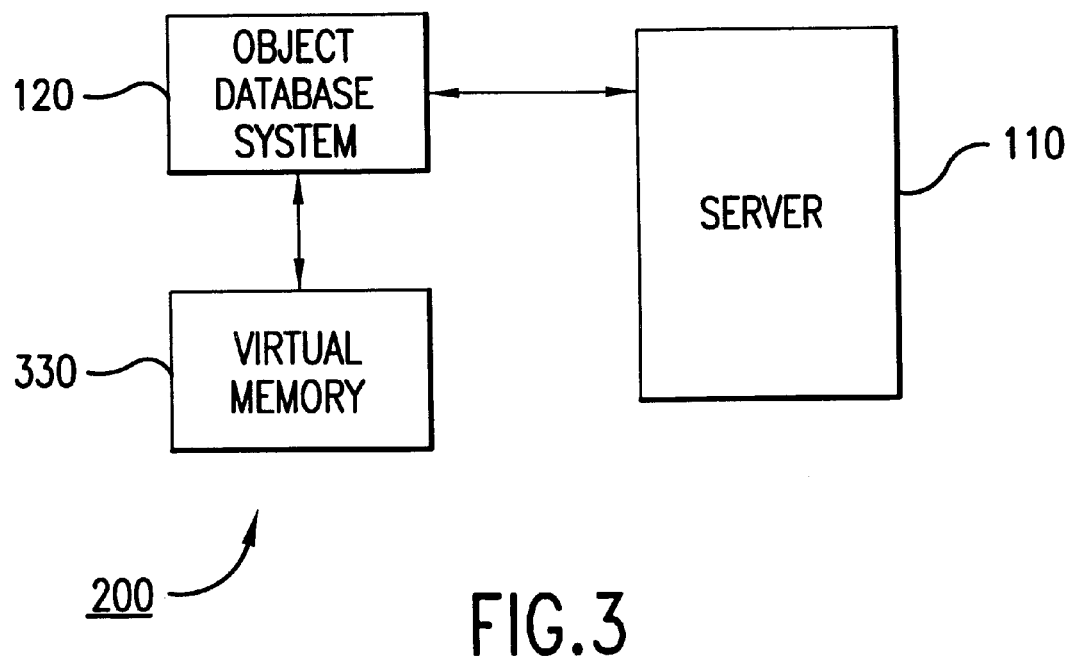
FIG. 3 is a diagram showing the flow of attribute data using a virtual memory.

FIG. 3 is a diagram of a server system 200 showing interaction between the server 110, the object database system 120 and the virtual memory 330. The object database system 120 includes any known memory devices, data processors, database management programs (such as Oracle, etc.), etc. The object database system 120 reads and writes attributes to or from disk when required by the server 110. The object database system 120 performs this function for both persistent and non-persistent attributes. However, non-persistent attributes are stored in virtual memory 330.

While the object database system 120 and virtual memory 330 are shown as a separate units from the server 110, the object database system 120 and the virtual memory 330 may be included as internal or external memories of the server 110. When external, the object database system 120 and the virtual memory 330 may be centralized even if the server system 200 is distributed. However, for ease of discussion, whether the object database system 120 and the virtual memory 330 are internal or external to the server, or distributed or centralized, they may be referred herein after as the object database system 120 and the virtual memory 330.

If a request is made for an attribute, the object database system 120 searches for the requested attribute in the virtual memory 330. If the attribute is found in the virtual memory 330, the object database system 120 calls the particular callback function.

Figure 4:
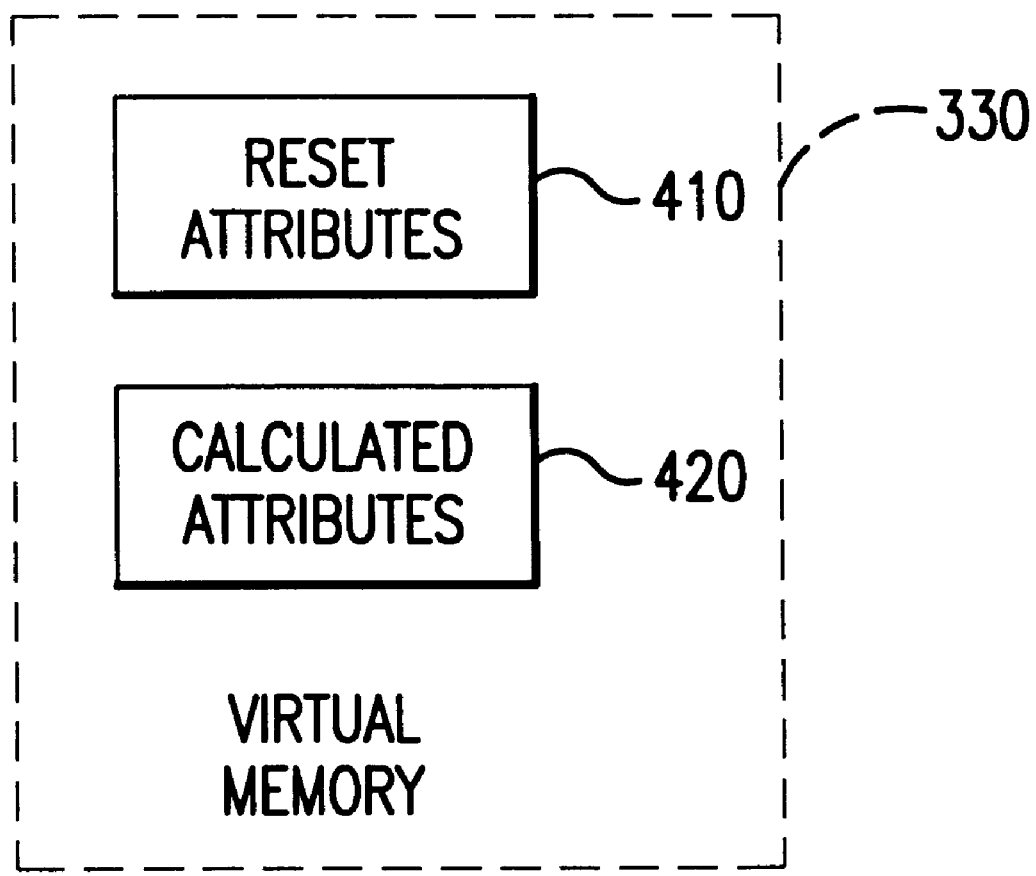
FIG. 4 is a diagram of the virtual memory.

As shown in FIG. 4, the virtual memory 330 may include two types of non-persistent attributes, reset attributes 410 and calculated attributes 420. Reset attributes 410 are attributes that are reset during system restart. For example, a "state" attribute is an attribute that changes regularly during the course of system operation, yet during system restart, the value is reset to an initial value.

A calculated attribute can be calculated or derived from other attributes during system restart and/or at runtime. An example of a calculated attribute 420 is the position of a print job in the print queue. Calculated attributes 420 may also be of the type that is not stored in virtual memory 320 but may be calculated using the appropriate callback function.

For example, the value of the print job position in the print queue is an attribute that changes frequently as jobs higher in the queue are processed and jobs lower in the queue are promoted or change priority. In a queue which contains a large number of jobs, 1,000 for example, it would be difficult for the object database 120 to transactionally update the queue position attribute of each job every time a job was removed from the queue for processing or every time a job changed positions in a queue due to a promotion or priority modification. For example, when a print job is completes, the print job currently in position 10 would move to position 9, etc. If another person creates a print job with a higher priority that places the job above position 9 in the print queue, the print job at position 9 would be repositioned at position 10. Thus, the print job positions may change several times a minute.

However, because a job's position in the queue at system restart can be calculated from its priority and submission time, there is no need to maintain the print queue position attribute persistently. These non-persistent attributes may be stored in a virtual memory 330. The object database system 120 can then access the virtual memory 330 so that the print job position attribute may be easily calculated from its priority and submission time. Thus, the print queue position may be provided to a requester without the need to maintain the attribute persistently and over-burdening the object database system 120.

In order to provide this non-persistent attribute capability to the object implementations, the object database system 120 must allow the registration of an attribute as non-persistent. The object implementation that registers an attribute as non-persistent provides a set of callback functions to be used by the object database system 120. These callback functions are a SetFunction, GetFunction, RollbackFunction, IsPresentFunction and DeleteFunction.

The SetFunction is called when the attribute value is set. The implementation of this function should store the value in virtual memory . The virtual memory must maintain the value of the attribute according to the object instance. The previous value of the attribute must also be maintained, in case there is a problem when a transaction is committed. If the attribute is of the sort that should never be set, but rather always calculated, as in the case with the queue position attribute, this function implementation can be simply omitted. Since the print queue position value is never set, it is calculated when requested using the GetFunction.

The GetFunction is called when the attribute value is retrieved. The implementation of this function either accesses the value stored in virtual memory for the particular object instance or it calculates the value on the fly, as appropriate.

The RollbackFunction is called if the transaction commit encounters a problem after the SetFunction has already been called for the attribute. The implementation of this function restores the previous value as the current value, thereby nullifying the preceding SetFunction call.

The IsPresentFunction is called to determine if the attribute has a value for the specified object instance. The print management system allows object attributes to have no values. This function simply returns "True" if the attribute has a value in virtual memory for the specified object instance, or "False" if the object does not have a value.

The DeleteFunction is called to remove the attribute value for an object instance from virtual memory.

The object database system 120 gives the illusion that all attributes are stored persistently, because all attributes are stored and retrieved using the same methods. However, the implementation of the object database system 120 provides the differentiation between persistent and non-persistent attributes based on the registration of the object implementations. The five simple functions above are all that is required to alleviate a tremendous amount of unnecessary disk input and output.

Figure 5:
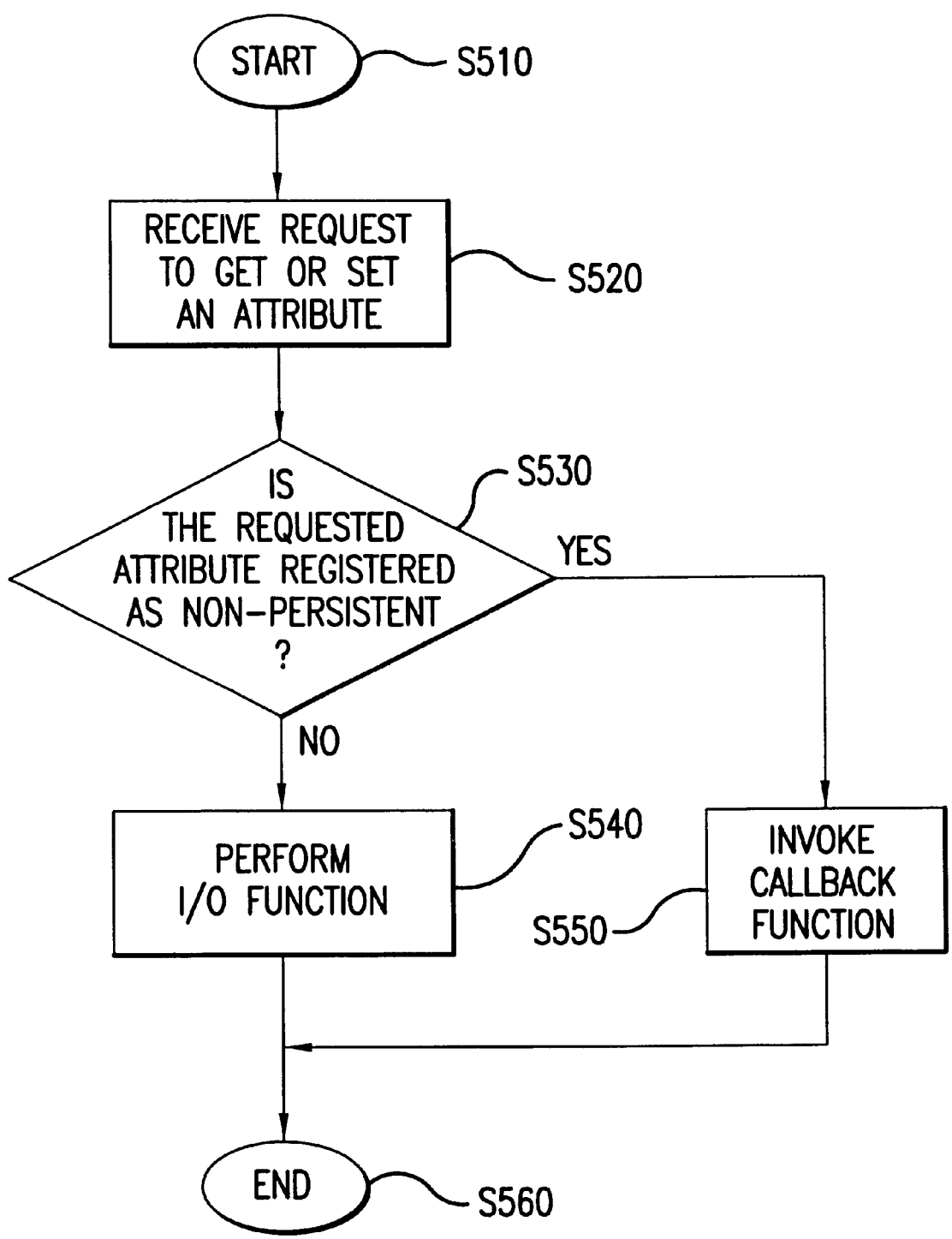
FIG. 5 is a flowchart of the object database implementation.

FIG. 5 is a flowchart of the object database system 120 implementation. Beginning at step S510, control continues to step S520, where the object database system 120 receives a request to get or set an attribute. Next, at step S530, the object database system 120 determines whether the requested attribute is registered as non-persistent. If the requested attribute is non-persistent, control continues to step S550. Otherwise, control goes to step S540. At step S550, the object database system 120 invokes the get or set callback function. Then, control then goes to step S560 and ends.

If the object database system 120 determines that the requested attribute is not registered as non-persistent in step S530, the input and output (I/O) functions are performed in step S540. Then, control then goes to step S560 and ends.

As shown in FIG. 5, as well as in the example outlined above, the implementation of non-persistent attributes from a separate virtual memory is preferably performed on a programmed general purpose computer. However, the implementation of non-persistent attributes can also be performed on a special purpose computer, a program microprocessor or microcontroller and peripheral integrated circuit elements, and ASIC or other integrated circuit, a hardwired electronic or logic circuit such as a discrete element circuit, a programmable logic device such as a PLD, PLA, FGPA or PAL or the like. In general, any device in which a finite state machine capable of implementing the flowchart shown in FIG. 5 in the example illustrated above can be used to perform the implementation of non-persistent attributes.

While this invention has been described with specific embodiments thereof, it is evident that many alternatives, modifications and variations will be apparent to those skilled in the art. Accordingly, the preferred embodiments of the invention as set forth herein arc intended to be illustrative, not limiting. Various changes may be made without departing from the spirit and scope of the invention as defined in the following claims.

What is claimed is:

1. A print management system for storing persistent and non-persistent print management attributes comprising:
   a first processor that sends and receives signals to and from an output device and processes print requests received from a second processor;
   the second processor that submits print requests and communicates with the first processor;
   a database system that stores persistent print management attributes and where the database system processes requests for persistent print management attributes and requests for non-persistent print management attributes based on requests of the first processor;
   a virtual memory system responsive to the database system comprising non-persistent print management attributes, and where the virtual memory system stores non-persistent print management attributes not stored in the database system;
   wherein the first process or retrieves at least one of persistent print management attributes and non-persistent print management attributes from the database system when at least one of print requests, output device control and print management operations are performed.

2. The system of claim 1, wherein each persistent and non-persistent attribute has an object identifier (OID), a syntax and a value.

3. The print management system of claim 1, wherein if the database system determines that the print management attribute is stored in the virtual memory, the database system calls for the non-persistent print management attribute using a callback function, and wherein if the database system determines that the print management attribute is not stored in the virtual memory, the database system performs the request.

4. The print management system of claim 3, wherein the callback function includes one of a GetFunction, a SetFunction, a RollbackFunction, an IsPresentFunction, and a DeleteFunction.

5. The print management system of claim 1, wherein the database system includes a database and a processor.

6. The print management system of claim 1, wherein the non-persistent attributes include calculated print management attribute.

7. The print management system of claim 1, wherein the non-persistent print management attributes include print management attributes that are reset at system restart.

8. A print management system for storing persistent and non-persistent print management attributes comprising:
   a first processor that sends and receives signals to and from an output device and processes print requests received from a second processor;
   the second processor that submits print requests and communicates with the first processor;
   a storage for storing the persistent print management attributes;
   a non-persistent storage for storing the non-persistent print management attributes, where non-persistent management attributes are not stored in the storage; and
   wherein the storage processes requests for persistent print management attributes and non-persistent print management attributes based on requests of the first processor.

9. The system of claim 8, wherein each persistent and non-persistent attribute has an object identifier (OID), a syntax and a value.

10. The print management system of claim 8, wherein if the storage means determines that the print management attribute is stored in the non-persistent storage means, the storage means calls for the non-persistent print management attribute using a callback function, and wherein if the storage means determines that the print management attribute is not stored in the non-persistent print management storage means, the storage means performs the request.

11. The print management system of claim 10, wherein the callback function includes one of a GetFunction, a SetFunction, a RollbackFunction, an IsPresentFunction, and a DeleteFunction.

12. The print management system of claim 8, wherein the non-persistent print management attributes include calculated print management attributes.

13. The print database management system of claim 8, wherein the non-persistent print management attributes include print management attributes that are reset at system restart.

14. The print management system of claim 8, wherein the storage means includes a database and a processor.

15. A method for storing persistent and non-persistent attributes in a print management system comprising:
   storing the persistent attributes in a database system responsive to attribute information requests from a first server;
   storing the non-persistent attributes only in a virtual memory, wherein the virtual memory is responsive to attribute information requests from the database system; and determining if the database system responds to the attribute information requests from the virtual memory, otherwise responding to the attribute information requests from the database system.

16. The method of claim 15, further comprising associating an object identifier (OID), a syntax and a value with each persistent and non-persistent attribute.

17. The method of claim 16, wherein if the determining step determines that the print management attribute is stored in the virtual memory, the method further comprises calling for the non-persistent print management attributes using a callback function, and wherein if the determining step determines that the print management attribute is not stored in the virtual memory, the method further comprises performing the request.

18. The method of claim 17, wherein the callback functions include one of a GetFunction, a SetFunction, a RollBack function, an IsPresent function, and a DeleteFunction.

19. The method of claim 16, wherein the non-persistent print management attributes include calculated print management attributes.

20. The method of claim 16, wherein the non-persistent print management attributes include print management attributes that are reset at system restart.

* * * * *